(12) United States Patent  
Hartelius et al.

(10) Patent No.: US 7,316,346 B1  
(45) Date of Patent: Jan. 8, 2008

(54) DECORATIVE MAILBOX COVER

(76) Inventors: Mark E. Hartelius, 8112 Komensky, Chicago, IL (US) 60652; Laura C. Pacheco, 8112 Komensky, Chicago, IL (US) 60652

( * ) Notice: Subject to any disclaimer, the term of this patent is extended or adjusted under 35 U.S.C. 154(b) by 0 days.

(21) Appl. No.: 11/265,886

(22) Filed: Nov. 2, 2005

Related U.S. Application Data

(62) Division of application No. 10/659,771, filed on Sep. 9, 2003, now Pat. No. 6,962,284.

(60) Provisional application No. 60/495,595, filed on Aug. 16, 2003, provisional application No. 60/409,517, filed on Sep. 9, 2002.

(51) Int. Cl.  
*A47G 29/12* (2006.01)

(52) U.S. Cl. ..................... 232/38; 40/606.06

(58) Field of Classification Search ............ 232/38, 232/17; D99/29–32; 40/606.06, 538; 150/158, 150/165, 166  
See application file for complete search history.

(56) References Cited

U.S. PATENT DOCUMENTS

| | | | | |
|---|---|---|---|---|
| D166,749 S | * | 5/1952 | Heinz | D99/30 |
| D222,652 S | * | 11/1971 | Kinskey | D99/30 |
| 4,149,333 A | | 4/1979 | Garfinkle | 40/106 |
| D256,287 S | | 8/1980 | McConnell | |
| 4,368,842 A | | 1/1983 | DeLange | 232/17 |
| D287,899 S | | 1/1987 | Lindheimer | D99/30 |
| D291,937 S | * | 9/1987 | Fisher | D99/30 |
| 4,712,731 A | | 12/1987 | Gramelspacher | 232/17 |
| 4,991,769 A | | 2/1991 | Todd | |
| 5,035,356 A | | 7/1991 | Granger | |
| 5,054,685 A | | 10/1991 | Roach | |
| D322,418 S | | 12/1991 | White | D11/144 |
| 5,178,321 A | | 1/1993 | Majewski | |
| 5,435,483 A | * | 7/1995 | Cox | 232/38 |
| D377,706 S | * | 1/1997 | Perrish | D99/30 |
| 5,620,136 A | | 4/1997 | Erwin | |
| D385,678 S | * | 10/1997 | Fitzgerald et al. | D99/29 |
| 5,890,525 A | * | 4/1999 | Shores | 150/166 |
| 5,984,172 A | | 11/1999 | Easterwood | |
| 6,032,808 A | | 3/2000 | Henson | |
| D428,546 S | * | 7/2000 | Rempfer | D99/30 |
| 6,296,180 B1 | * | 10/2001 | Blizzard | 232/38 |
| 6,474,543 B2 | * | 11/2002 | Grell | 232/38 |
| D475,502 S | * | 6/2003 | Catalano | D99/31 |
| 6,619,541 B2 | * | 9/2003 | Martin et al. | 232/38 |
| 6,726,089 B1 | * | 4/2004 | Jones | 232/38 |
| 6,772,938 B2 | * | 8/2004 | Martin et al. | 232/38 |
| 2002/0092901 A1 | * | 7/2002 | Paschal | 232/38 |

* cited by examiner

*Primary Examiner*—William L. Miller  
(74) *Attorney, Agent, or Firm*—Robert W. J. Usher

(57) ABSTRACT

A seasonally decorative cover for a mailbox has a three dimensional one-piece arched cover body decorated with seasonal symbols and messages and an underside formed with an arcuate recess for snugly receiving the top and opposite sides of the mailbox, so that the cover body can be mounted straddling the mailbox. One version is made of foamed polyurethane and another version is inflatable, having a skin of P.V.C. An anchoring eye for tethering a balloon is formed from the skin material at the top of the body and further anchoring eyes are formed at the bottom of each side for receiving cover securing ties passing under the mailbox.

6 Claims, 10 Drawing Sheets

DECORATIVE MAILBOX COVER

RELATED APPLICATIONS

This application claims priority from provisional application 60/409,517, filed Sep. 9, 2002 and from provisional application 60/495,595, filed Aug. 16, 2003. The disclosures of both provisional applications are incorporated herein by reference. This application is a divisional of 10/659,771 filed Sep. 9, 2003, now U.S. Pat. No. 6,962,284 priority from which is claimed and the disclosure of which is incorporated herein by reference.

FIELD OF THE INVENTION

The invention relates to decorative covers for releasably mounting on mailboxes particularly but not solely to reflect different holiday or seasons.

BACKGROUND OF THE INVENTION

Many home owners enjoy decorating the outside of their property with symbols celebrating different holidays or seasons, for example, Xmas trees, fairy lights, holly wreaths, pumpkins and figurines such as Santa Claus and Reindeer. It is often desired to display such decorations as prominently as possible for maximum exposure and enjoyment by a passer-by or neighbor.

One fixture common to most individual houses is the United States Postal Service mailbox which is usually a standardized rectanguloid box with an arcuate top. The mailbox usually stands on a post, in a most prominent position in the front yard of each house, adjacent the street so that it is immediately noticed by the mailman and passers-by.

Numerous attempts have been made over many years to provide mailboxes with decorative or symbolic coverings which do not interfere with the basic mailbox function and contravene U.S. Post Office Regulations.

U.S. design Pat. 287,899 issued in 1987 and U.S. design Pat. 322,418 issued to White in 1991 teach examples of prior approaches having inside profiles conforming to the mailbox shape, for mounting thereon.

However, such prior covers which have a solid or three dimensional structure for maximum decorative effect are of relatively complex, multipart construction and commensurately expensive to manufacture. Unless of sufficiently weighty, and, as a result, relatively expensive construction, prior decorative covers can also be relatively time consuming and fiddlesome to attach releasably to the mailbox for removal after an event or season depicted by the cover has passed.

SUMMARY OF THE INVENTION

It is one object of the invention to provide a seasonally decorative cover which a householder can easily mount reliably and yet releasably, on a standard mailbox for prominent display.

It is another object of the invention to provide such decorative mailbox cover which is of light weight and can be mass produced economically.

According to one aspect of the invention, the seasonally decorative cover comprises a solid body decorated with one or more seasonal symbols and releasable means for mounting the body on a mailbox so that the season symbols are displayed prominently (to a passer-by). An underside of the body is formed with a recess or cavity for receiving, preferably snugly, at least an upper part of the mailbox, so as to securely sit on the arcuate top of the mailbox and, preferably, around opposite sides of the mailbox, astride the mailbox, saddle fashion.

The mailbox may be supported on a transverse beam mounted adjacent an upper end of a post and the releasable mounting means comprises one or more ties such as inelastic or elastic straps or tapes for extending under the beam and secured or adapted to be secured at opposite ends to portions of the body on opposite sides of the recess or cavity.

The straps may be terminated at one of their ends by rigid tabs for receipt in slots formed in an underside of the body portions on opposite sides of the mailbox and have other ends terminated by releasable fastening fabric with hook to hook or hook to loop fastening known, for example, by the trade mark VELCRO. Alternatively, one end of each strap or tape is fastened by adhesive and staples to the cover body.

The decorative body may be made of foamed polyurethane or other suitable material.

In a method of making a mailbox cover, a clay block is applied to a mailbox to extend transversely over the curved mailbox top and at least part way down respective opposite vertical sides so that an underside is molded into an inverted channel or U-section forming an arch adopting the form of the curved mailbox top and vertically extending sides, and exposed portions are sculpted with desired decorative symbols. The clay block former is removed from the mailbox and coated with silicon to provide a silicon mold subsequently divided into front and rear halves, lined internally with foamed polyurethane and baked to provide two shells which are glued together, trimmed and painted.

The decorative body could also be made by other well known mass production techniques such as rotocasting, injection molding or blow molding.

According to another aspect, the invention provides a decorative mailbox cover comprising an skin of airtight material, preferably P.V.C., inflatable to form an arch shaped body having pair of inflated leg portions depending in spaced apart, parallel side by side relation from an inflated transverse top portion with an underside of arcuate shape conforming to the top of the mailbox, at least a front of the arch being marked with decorative indicia celebrating one of a season, holiday and event, releasable means attached to the skin for mounting the inflated body on a mailbox so that the decorative indicia are displayed prominently.

Preferably, the releasable mounting means a pair of eyes formed in the skin material at the feet of the leg portions and a tie preferably, elastic, for tying through the eyes and extending under the mailbox.

Desirably, the leg portions have flat inner surfaces for abutment over their surface with the straight sides of the mailbox.

The skin may be formed with a balloon anchoring eye at the top of the body by which a balloon may be tethered to the mailbox cover.

The skin comprise a front panel and a rear panel of identical arch shape secured together in spaced apart parallel planes by a single elongated side panel strip extends completely around a periphery of the body and is heat sealed along respective opposite longitudinal edge portions to entire peripheral edges of both front and rear panels and has opposite transverse edges heat sealed together.

Such construction requires only three individual portions of PVC, enabling efficient and economical manufacture at high volume by conventional mass production techniques.

The eyes at the feet of the leg portions are formed by overlapping edge portions of adjacent panels and heat sealed together to form tabs of double thickness.

BRIEF DESCRIPTION OF THE DRAWINGS

In order that the invention may be readily understood, a specific embodiment thereof will now be described, by way of example only and with reference to the accompanying drawings in which.

DESCRIPTION OF PARTICULAR EMBODIMENTS

Figure 1B:
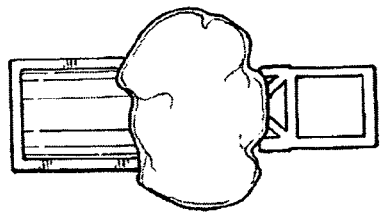
FIGS. 1a and 1b are, respectively, a perspective view and a top plan view of decorative mailbox cover or 'mailbox topper' embodied as a Halloween Witch character on a post-mounted mailbox.
Figure 1A:
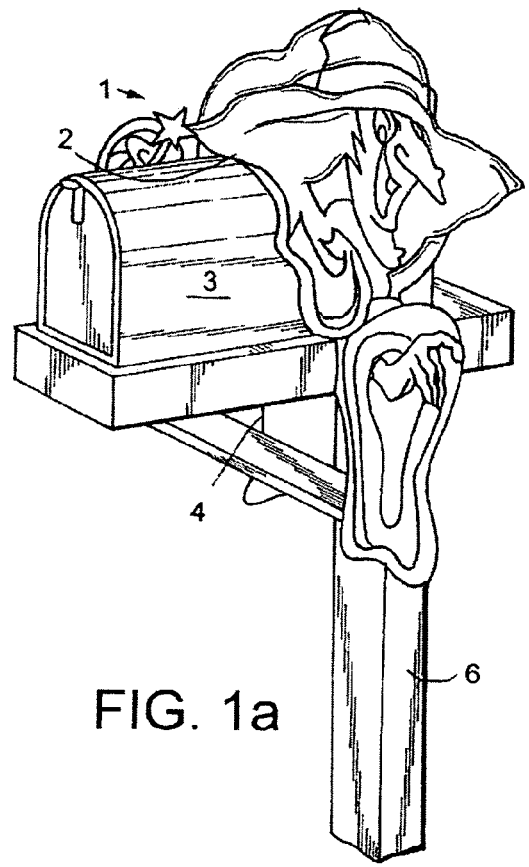

The first embodiment of seasonally decorative cover shown in FIGS. 1a and 1b comprises a solid body 1 molded of foamed polyurethane in the form of a Halloween witch. The cover body 1 is of arch or saddle shape with an underside forming a recess or cavity 2 for snugly receiving the top and opposite sides of the mailbox 3 and opposite legs 4 stably seated astride the mailbox so that the cover bridges the mailbox.

Figure 3A:
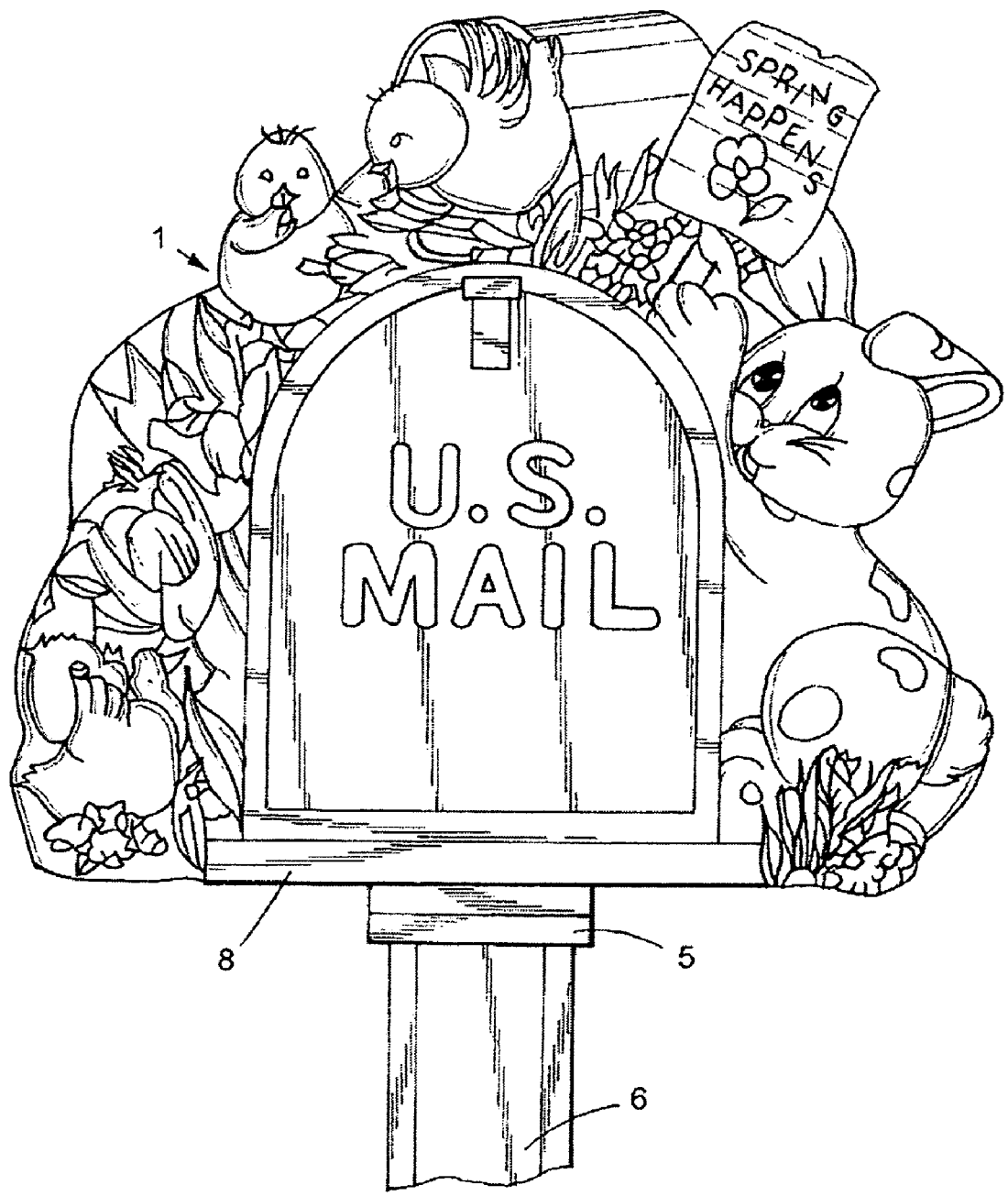
FIGS. 3a and 3b are, respectively, front and rear views of a second embodiment of mailbox cover on a post-mounted mailbox.
Figure 3B:
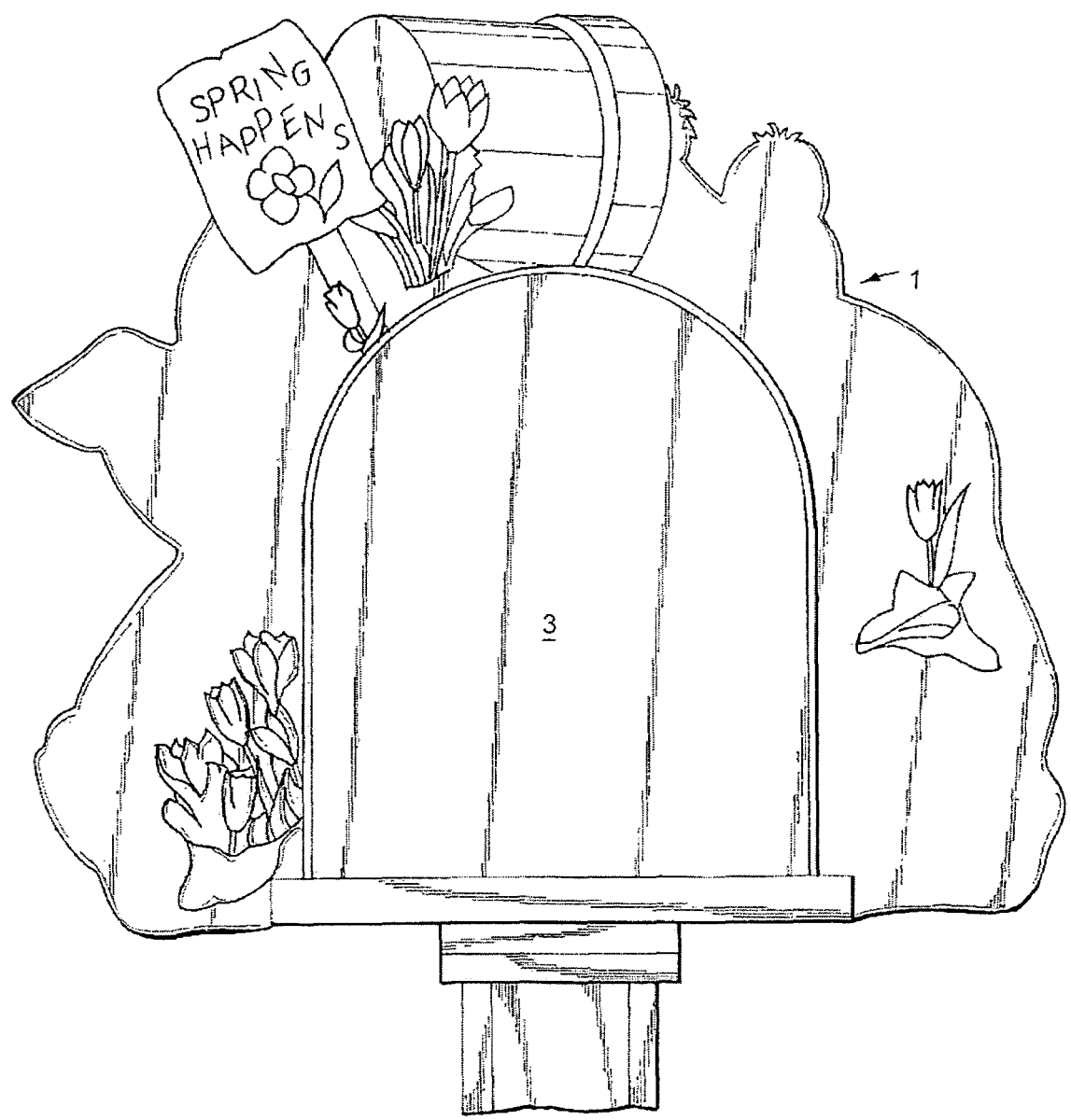

The mailbox has an arcuate top and opposite, parallel, horizontally elongate, sides depending from the top and is supported on a transverse beam 5 mounted at an upper end of a support post 6. Releasable mounting means comprising one or more ties such as inelastic or elastic straps or tapes 7 extending under the beam and secured or adapted to be secured at opposite ends to portions of the body on opposite sides of the recess or cavity. The transverse beam 5 may be surmounted by a platform 8 for additional support of the mailbox, as shown in FIG. 3b.

Figure 2A:
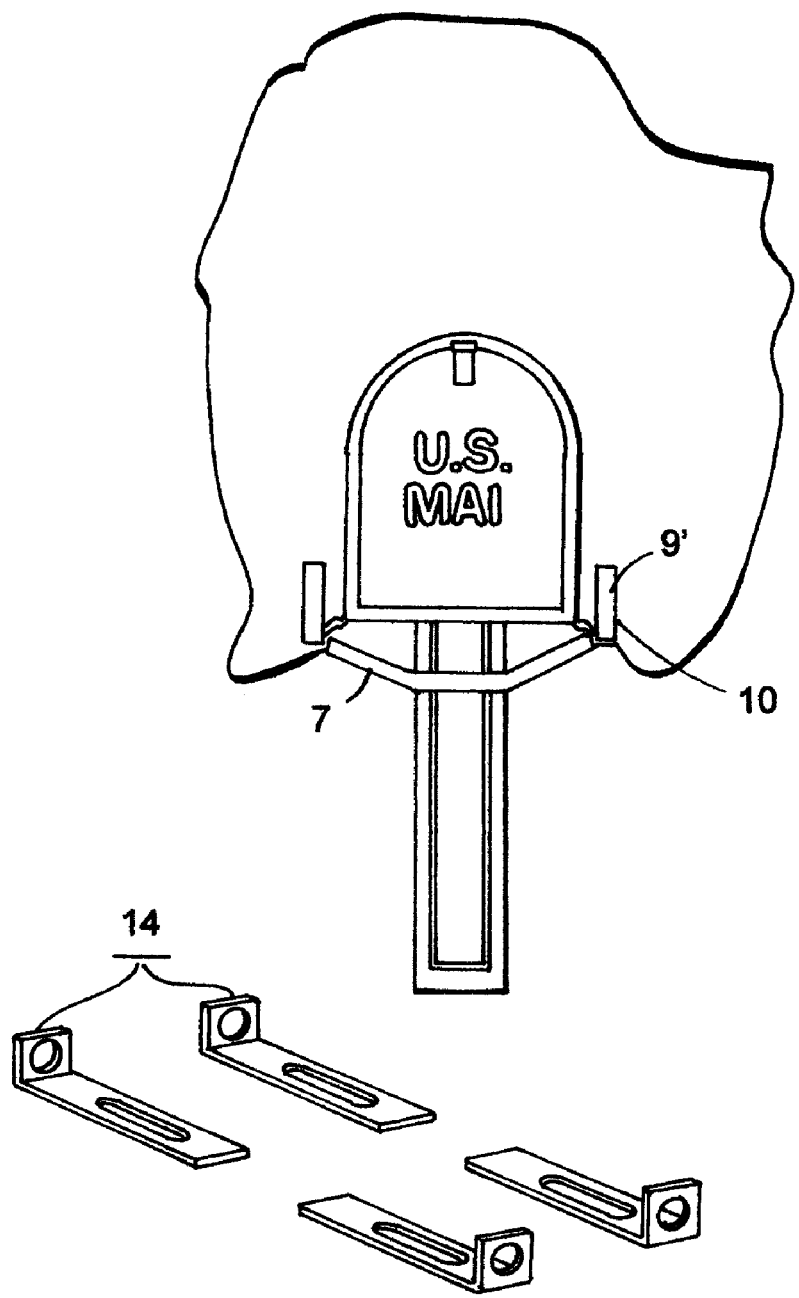
FIGS. 2a and 2b are schematic rear views of a mailbox cover on a post-mounted mailbox illustrating alternative mounting structures.
Figure 2B:
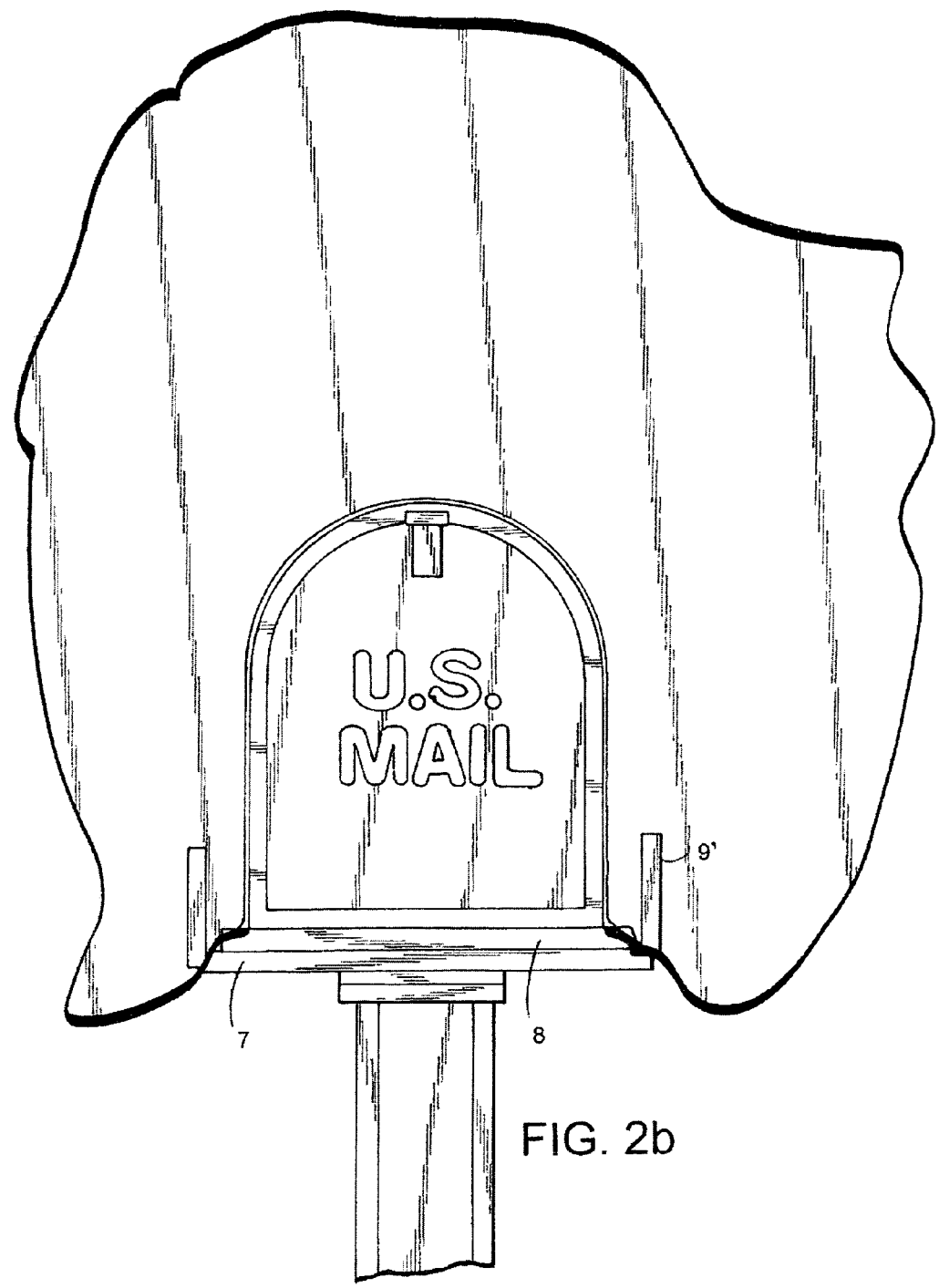

As shown in FIG. 2b, the elastic or inelastic straps 7 are terminated at one of their ends by rigid tabs 9' for receipt in slots 10 formed in an underside of the body portions on opposite sides of the mailbox and extend under the transverse beam or platform to secure the cover to the mailbox. As shown in FIG. 2a, when a mailbox supporting platform or shelf is not provided, four mounting brackets 14 are fastened by screws to opposite sides of the mailbox and to the underside of the transverse beam to mount the mailbox securely of the beam.

In another embodiment, the straps are inelastic and two in number, each having one end fastened by adhesive and staples to the cover body and other mating ends terminated by releasable fastening fabric with hook to hook or hook to loop fastening known, for example, by the trade mark VELCRO.

Figure 1C:
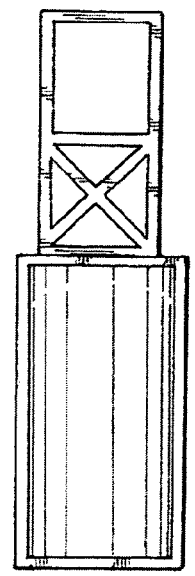
FIG. 1c is a schematic top view of appropriate mounting location for the mailbox cover.

As illustrated in FIGS. 1a-c, the cover is approximately 12 inches in depth (front to rear) and must not obstruct the standard flag mounting area which is the front 9.5 inches of the mailbox.

Figure 4A:
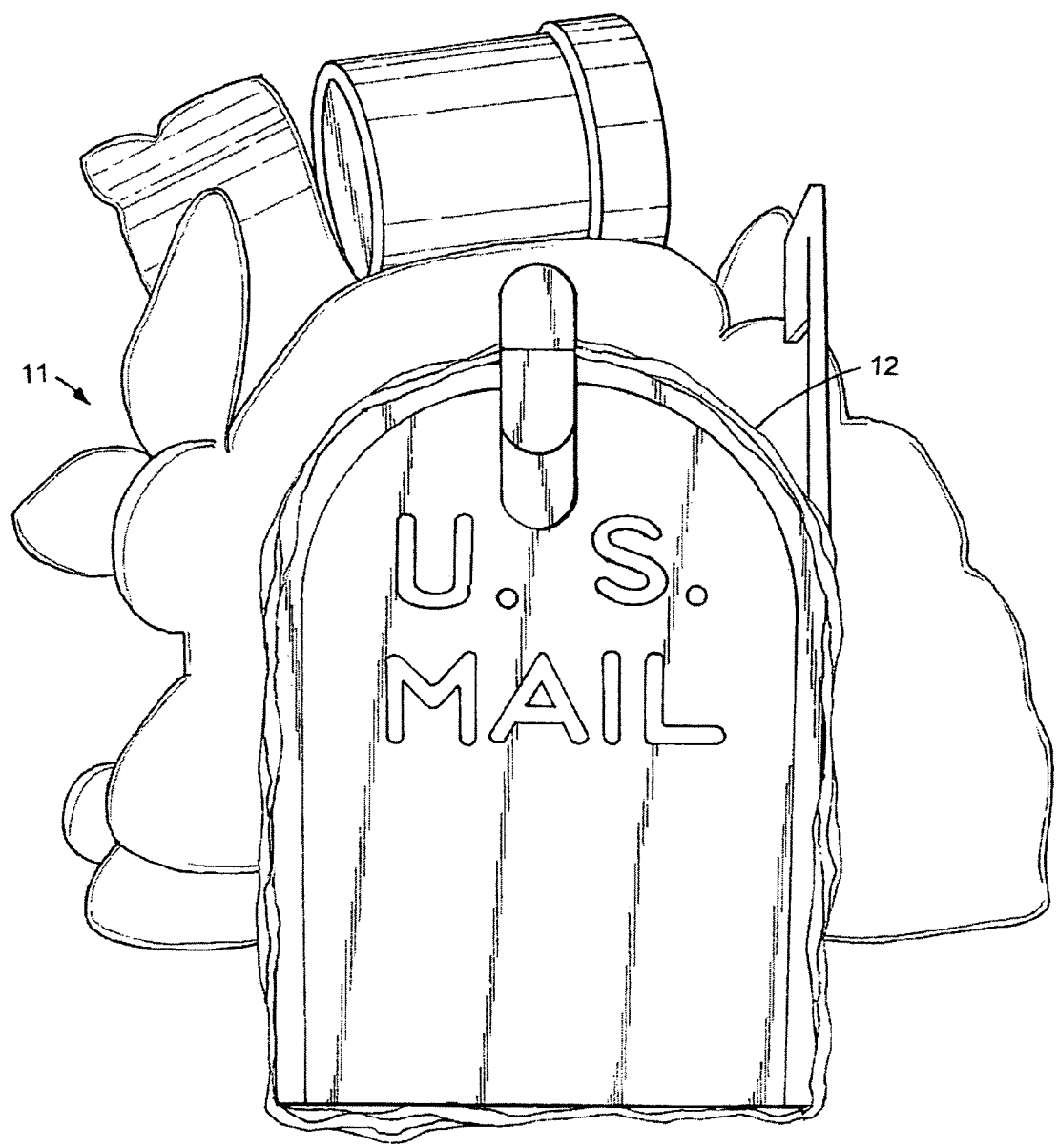
FIGS. 4a and 4b are, respectively, front and rear views of a clay former of the second embodiment of mailbox cover.
Figure 4B:
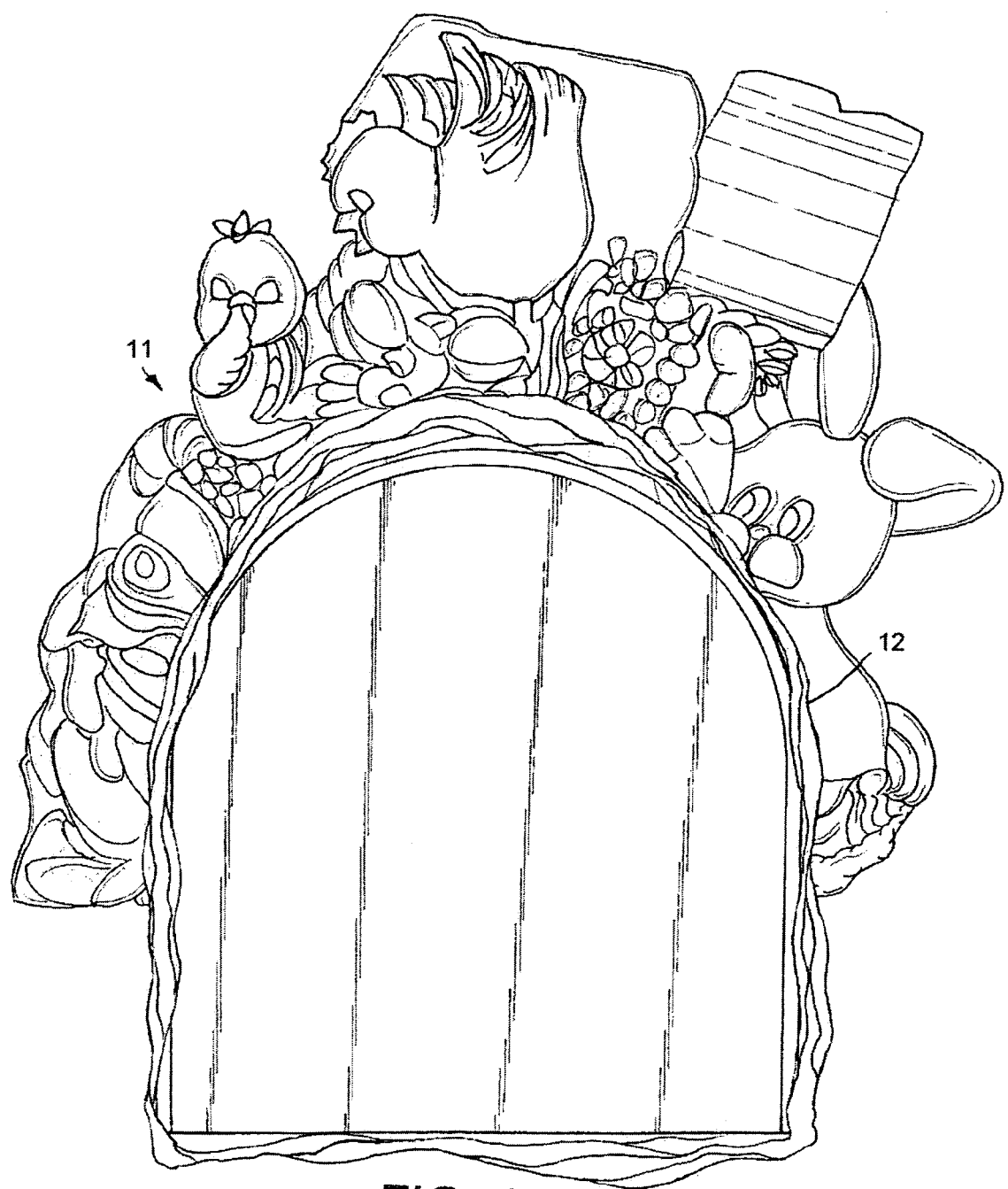
Figure 5A:
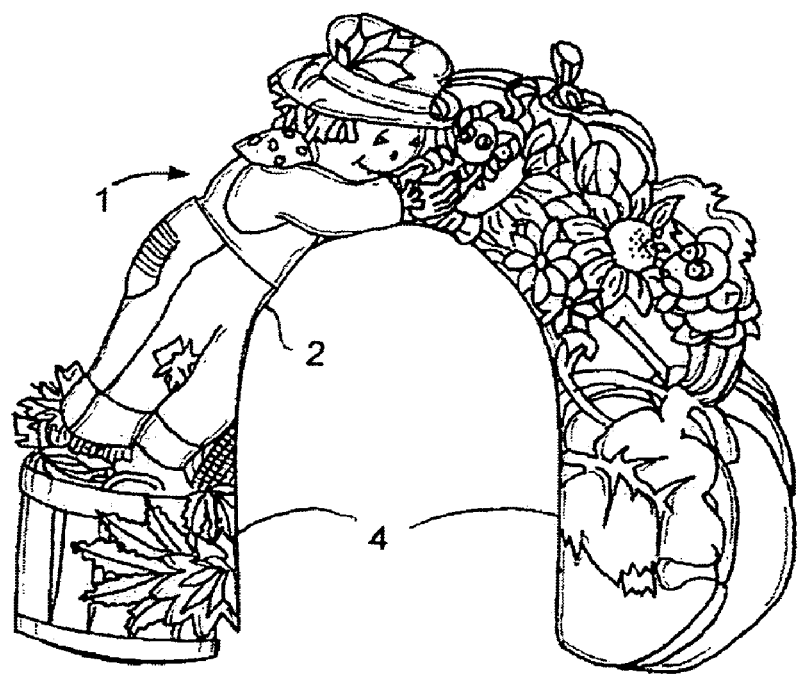
FIGS. 5a and 5b are, respectively, a front view and a side profile of a third embodiment of mailbox cover.
Figure 5B:

In making the decorative mailbox cover, as shown in FIGS. 4a and 4b, a clay block 11 is formed around a top and sides of a mailbox covered with a suitable plastic release sheet 12 and sculpted with desired decorative symbols. The clay block former is removed from the mailbox and coated with silicon to provide a silicon mold subsequently divided into front and rear halves, lined internally with foamed polyurethane and baked to provide two shells which are glued together, trimmed and painted.

The decorative body could also be made by other well known mass production techniques such as rotocasting, injection molding or blow molding.

Figure 6:
FIG. 6 is a schematic front elevational view of a fourth embodiment, which is inflatable, mounted on a maibox.
Figure 7:
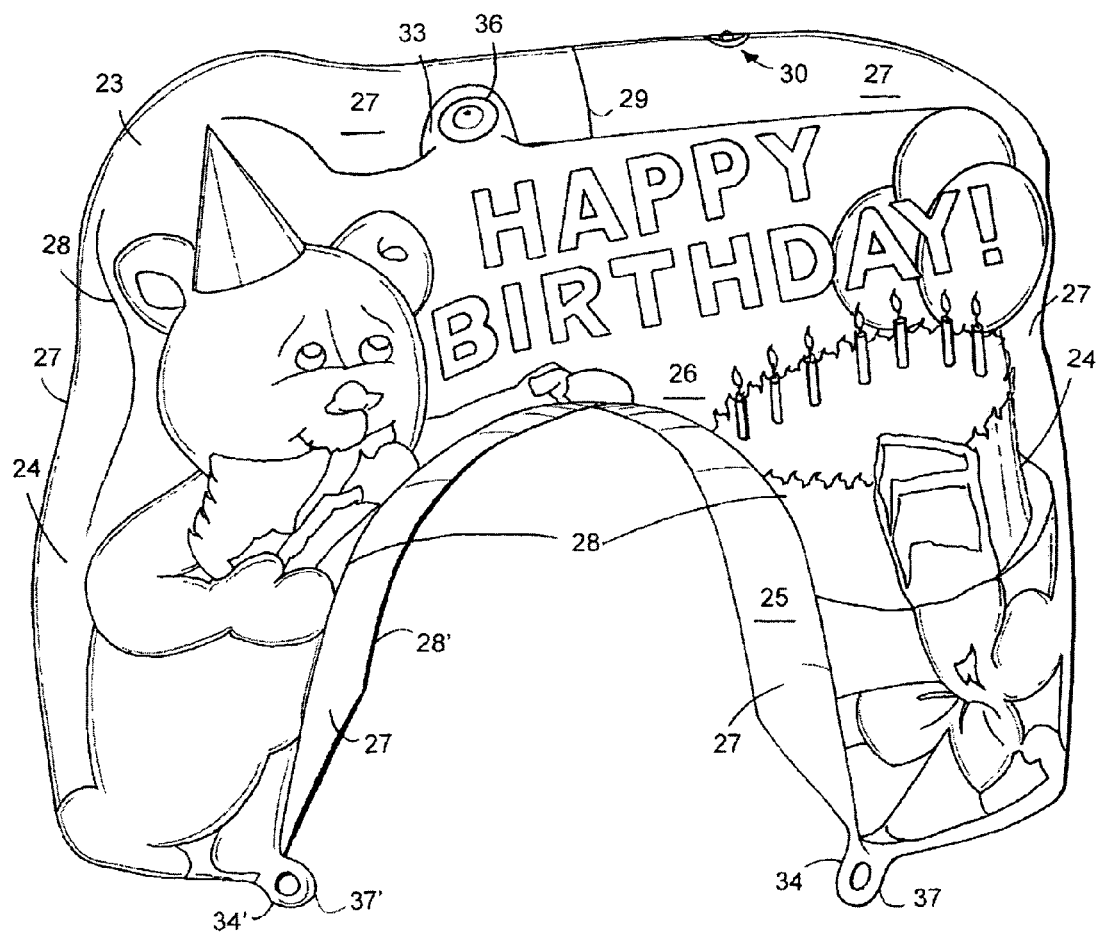
FIG. 7 is a front perspective view of a further embodiment, similar to that of FIG. 6 but having showing, schematically, tie receiving eyes for attaching the body to the mailbox.

As shown in FIG. 6, the fourth embodiment of the invention comprises an inflatable body 21 having a front decorated with one or more seasonal symbols, in this case a birthday greeting and an anchoring eye 22 for tethering a festive balloon.

The one-piece inflatable body comprises a PVC skin 23 inflatable into a similar mail box conforming shape to the earlier embodiments with respective leg portions 24 having flat inner surfaces 25 for abutment over their surface with the straight sides of the mailbox.

The PVC skin comprise a front panel 26 and a rear panel (not seen) of identical arch shape secured together in spaced apart parallel planes by a single elongated side panel strip 27 which extends completely around a periphery of the body and is heat sealed along respective opposite longitudinal edge portions to entire peripheral edges of both front and rear panels forming front and rear seams 28, 28' extending, respectively, around peripheries of front and rear faces, and has opposite transverse edges heat sealed together forming a seam 29 at the top.

Overlapping edge portions of adjacent front and side panels 26, 27 at the top and at the feet of the leg portions are heat sealed together to form tabs 33 and 34, 34' of double thickness in which anchoring respective eyes 36 and 37, 37' are formed (reinforced with respective grommets) for receiving a tie (e.g two pieces or VELCRO or an elastic cord) for extending under the mailbox for securely mounting the cover thereon.

When inflated, the body 21 may grip opposite sides of the mailbox, aiding stable mounting thereon.

The invention claimed is:

1. A seasonally decorative cover for a mailbox supported on a transverse beam extending from a post adjacent an upper end thereof, the mailbox having an arcuate top and opposite, parallel, horizontally elongate sides depending from the top, the cover comprising a rigid, integral, hollow, cover body molded to provide outside surface protuberances forming contours of at least one character and recognizable object symbolizing one of a season, holiday and event and an underside formed with an arcuate recess for snugly receiving the top and opposite sides of the mailbox to mount the cover body on the mailbox saddle fashion, and releasable means for mounting the cover body to the mailbox so that said at least one character and recognizable object symbolizing one of a season, holiday and event is displayed prominently, wherein the releasable mounting means comprises at least one tie for extending under the beam and means for securing said at least one tie at opposite ends to portions of the cover body on opposite sides of the recess, and wherein said at least one tie comprises an elastic strap terminated at opposite ends by respective rigid tabs and said means for securing said at least one tie comprises slot form sockets formed in the cover body on respective opposite sides of the recess for releasably receiving respective tabs.

2. A seasonally decorative cover according to claim 1 wherein the cover body is made of foamed polyurethane.

3. A seasonally decorative cover according to claim 1 wherein the cover body comprises two half shells molded from foamed plastic and assembled together.

4. A seasonally decorative cover for a mailbox supported on a transverse beam extending from a post adjacent an upper end thereof, the mailbox having an arcuate top and opposite, parallel, horizontally elongate sides depending from the top, the cover comprising an integral, rigid, cover body having an outside decorated with indicia depicting one of a season, holiday and event and an underside formed with an arcuate recess for snugly receiving the top and opposite sides of the mailbox to mount the cover body on the mailbox saddle fashion, and releasable means for mounting the cover body to the mailbox comprising an elastic strap terminated at respective opposite ends by respective rigid tabs and slot form sockets formed in the cover body on respective opposite sides of the recess for releasably receiving respective tabs thereby securing the elastic strap at opposite ends to portions of the cover body on opposite sides of the recess with the strap extending under the beam so that said at least one seasonal symbol and message is displayed prominently.

5. A seasonally decorative cover according to claim 4, wherein said cover body comprises a polyurethane foam shell.

6. A seasonally decorative cover for a mailbox supported on a transverse beam extending from a post adjacent an upper end thereof, the mailbox having an arcuate top and opposite, parallel, horizontally elongate sides depending from the top, the cover comprising a rigid, integral cover body comprising a plastic foam shell molded with outside surface protuberances forming contours of at least one character and recognizable object symbolizing one of a season, holiday and event and an underside formed with an arcuate recess for snugly receiving the top and opposite sides of the mailbox to mount the cover body on the mailbox saddle fashion, and releasable means for mounting the cover body to the mailbox so that said at least one character and recognizable object symbolizing one of a season, holiday and event is displayed prominently, wherein the releasable mounting means comprises at least one tie for extending under the beam and means for securing said at least one tie at opposite ends to portions of the cover body on opposite sides of the recess, and wherein said at least one tie comprises an elastic strap terminated at opposite ends by respective rigid tabs and said means for securing said at least one tie comprises slot form sockets formed in the cover body on respective opposite sides of the recess for releasably receiving respective tabs.

\* \* \* \* \*